US008874055B2

United States Patent
Su

(10) Patent No.: US 8,874,055 B2
(45) Date of Patent: Oct. 28, 2014

(54) SYSTEMS AND METHODS FOR REDUCING POWER CONSUMPTION OF A COMMUNICATIONS DEVICE USING MULTIPLE ELEMENTS IN A RECEIVER CHAIN

(75) Inventor: Jin-Sheng Su, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 455 days.

(21) Appl. No.: 13/236,049

(22) Filed: Sep. 19, 2011

(65) Prior Publication Data

US 2013/0072256 A1 Mar. 21, 2013

(51) Int. Cl.
*H04B 7/00* (2006.01)
*H04W 52/02* (2009.01)
*H04W 88/02* (2009.01)

(52) U.S. Cl.
CPC ............ *H04W 52/0274* (2013.01); *Y02B 60/50* (2013.01); *H04W 88/02* (2013.01)
USPC .......................... 455/180.3; 455/86; 455/209

(58) Field of Classification Search
CPC ............................ H04W 56/001; H04M 9/087

USPC ........................................................ 455/502
See application file for complete search history.

(56) References Cited

U.S. PATENT DOCUMENTS

| 6,208,871 B1 * | 3/2001 | Hall et al. ..................... 455/517 |
| 2004/0123176 A1 * | 6/2004 | Maiyuran et al. ............. 713/500 |
| 2006/0111141 A1 * | 5/2006 | Smith et al. ................ 455/553.1 |
| 2009/0168676 A1 * | 7/2009 | Olson ........................... 370/311 |
| 2009/0201092 A1 * | 8/2009 | Yuan et al. ........................ 331/2 |
| 2012/0281603 A1 * | 11/2012 | Takatori ......................... 370/286 |
| 2013/0079000 A1 * | 3/2013 | Syrjarinne et al. ............ 455/427 |

* cited by examiner

*Primary Examiner* — Marcos Batista
*Assistant Examiner* — Frank Donado
(74) *Attorney, Agent, or Firm* — Sterne, Kessler, Goldstein & Fox P.L.L.C.

(57) ABSTRACT

Systems and methods according to embodiments of the present invention are provided for increasing the power efficiency of a communications device by allowing it to support dual-SIM functionality while issuing simultaneous wake ups for each SIM. Embodiments of the present invention leverage time sharing solutions to minimize the amount of circuitry needed in a communications device to issue wake ups while avoiding the drawbacks of other time sharing solutions that result in increased overhead due to requiring multiple transitions from an idle state to an active state.

18 Claims, 5 Drawing Sheets

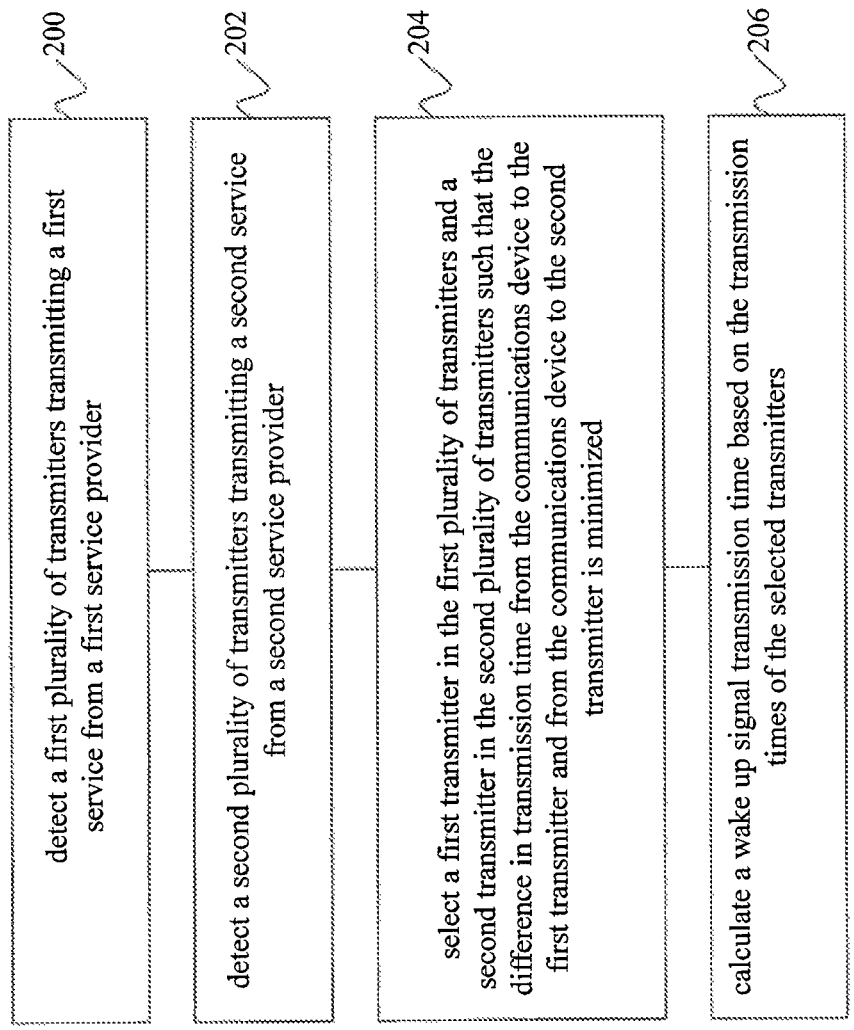

SYSTEMS AND METHODS FOR REDUCING POWER CONSUMPTION OF A COMMUNICATIONS DEVICE USING MULTIPLE ELEMENTS IN A RECEIVER CHAIN

FIELD OF THE INVENTION

This invention relates to mobile communications and more specifically to systems for reducing power consumption in mobile communications.

BACKGROUND OF THE INVENTION

Some communications devices (e.g., cellular phones) support two or more single subscriber identity modules ("SIMs" or "SIM cards"). SIMs are removable integrated circuits that securely store keys for subscriber identification, information regarding the cellular phone user (e.g., a unique cellular phone user number), a list of services for which the user has access, user passwords, and/or stored data for the user (e.g. a list of phone numbers). Thus, if a communications device supports two (or more) SIMs, the communications device can be configured to receive service (e.g., cellular service) from two (or more) different service providers, each service provider associated with a different SIM. For example, an owner of a communications device may receive service from a service provider for work-related phone service and service from a service provider for personal phone service. In some cases, each SIM is also associated with its own phone number specific to the service.

If a communications device is in idle mode, it can intermittently issue a "wake up" command at a predetermined period of time to check for incoming transmissions for a SIM. When a communications device supports dual SIMs, each of these SIMs is monitored for incoming transmissions (e.g., incoming cellular phone calls). Thus, if two or more SIMs are being monitored, the communications device consumes more battery power because it wakes up to check for incoming transmissions more often.

What is needed are systems and methods for reducing battery power consumption in a communications device having multiple SIMs.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, sere to explain the principles of the present invention. In the drawings:

FIG. 2 is a flowchart illustrating a method of calculating a wake up signal transmission time in accordance with an embodiment of the present invention.

Figure 1A:
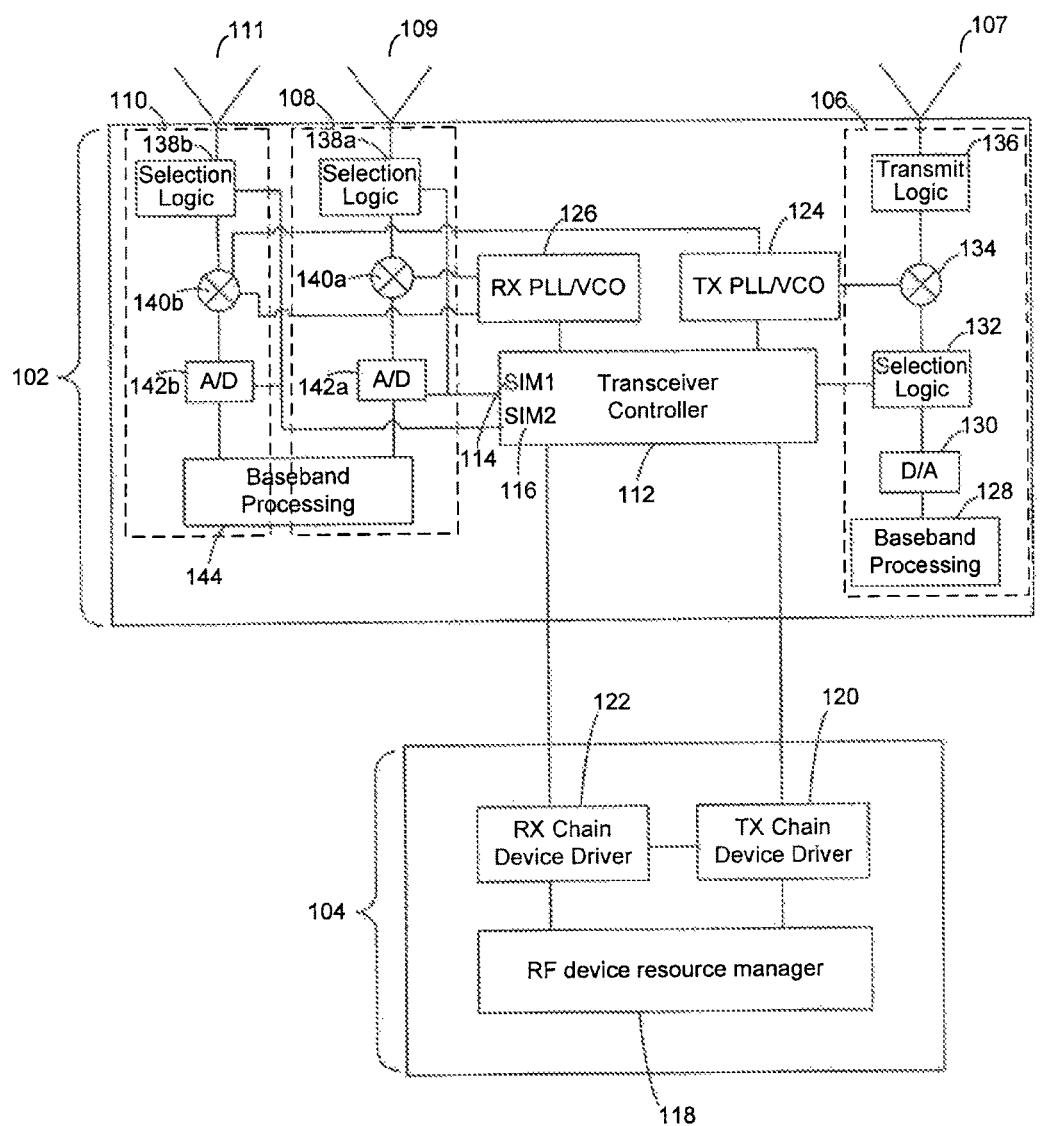
FIG. 1A is a diagram illustrating a system for reducing power consumption using main and diversity receiver chains of a communications device according to an embodiment of the present invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Some communications devices have a single receiver chain that is used by multiple SIMs. Thus, some communications devices equipped with only a single receiver chain use a time sharing method to check for incoming transmissions to each SIM using the shared receiver chain. For example, the communications device can wake up at a first time and check for incoming transmissions for the first SIM (e.g., for 100-200 ms) and then wake up at a second time and check for incoming transmissions for the second SIM (e.g., for an additional 100-200 ms). Thus, a communications device supporting multiple SIMs consumes more power while checking for incoming transmissions relative to a communications device supporting a single SIM.

The "waking up" process initiated by the communications device is associated with a battery power overhead required to transition the communications device from a lower-power idle state to an active (e.g., connected) state that supports the functionality associated with checking for incoming transmissions. Thus, by requiring the communications device to wake up additional times to support multiple SIMs, the battery power overhead caused by the waking up process is magnified. The battery power overhead is further increased by requiring the communications device to stay in the active state for a period of time (e.g., for 100-200 ms) as each SIM is checked for incoming transmissions. For example, in an embodiment, if the communication device supports two SIMs, the waking up overhead is approximately doubled, and, if the communications device supports three SIMs, the waking up overhead is approximately tripled.

To alleviate this unwanted overhead, embodiments of the present invention provide separate receiver chains in a communications device for each SIM. In an embodiment, the communications device wakes up and checks for incoming transmissions for each SIMs simultaneously, using a dedicated receiver chain for each SIM. Thus, embodiments of the present invention advantageously increase battery power efficiency by eliminating the need to implement a time sharing solution to monitor incoming transmissions to the communications device for all supported SIMs. By eliminating the need for this time sharing solution, the unwanted overhead described above is reduced because the communications device does not need to wake up more often than a communications device supporting only a single SIM. Rather, according to embodiments of the present invention, the communications device checks for incoming transmissions on all SIMs simultaneously.

Some communications devices include a "diversity receiver chain" for checking the performance of the communications device. For example, this diversity receiver chain can be used during a "connected mode" of a communications device (e.g., during a phone call) to monitor the performance of the phone call. Embodiments of the present invention utilize the diversity receiver chain as a separate receiver chain for an additional SIM so that incoming transmissions on both SIMs can be monitored simultaneously during a single wake up.

Further, embodiments of the present invention provide time sharing solutions to allow a communication device to conduct a transmission using one service without missing incoming transmissions on an idle service. For example, embodiments of the present invention enable a communications device to issue brief wake ups to an idle receiver associated with an idle service so that incoming calls are not missed while a call is in progress on an active service. Because the communications device is already in an active state when a transmission is in progress, these time sharing solutions avoid the unwanted overhead associated with the time sharing solutions discussed above, which require multiple wake ups for a communications device in idle mode. Further, the time sharing solutions provided by embodiments of the present invention leverage existing circuitry to issue wake ups to an inactive service while a transmission is in progress.

Thus, embodiments of the present invention advantageously increase the power efficiency of a communications device by allowing it to support dual-SIM functionality without the need to issue separate wake ups for each SIM. Further, embodiments of the present invention leverage time sharing solutions to minimize the amount of circuitry needed in a communications device while avoiding the drawbacks of other time sharing solutions that result in increased overhead due to requiring multiple transitions from an idle state to an active state.

2. SYSTEMS

A system 100 for reducing power consumption using main and diversity receiver chains of a communications device according to an embodiment of the present invention will now be explained with reference to FIG. 1A. FIG. 1A is a diagram showing a transceiver 102 of a communications device (e.g., a cellular phone). FIG. 1A also shows a software (e.g., firmware) device controller 104 of the communications device.

In FIG. 1A, the communications device includes a transmitter receiver chain 106 ("transmitter"), a main receiver chain 108 ("main receiver"), and a diversity receiver chain 110 ("diversity receiver"). In FIG. 1A, main receiver (RX) 108 is shown as being coupled to main antenna 109, and diversity receiver (RX) 110 is shown as being coupled to diversity antenna 111. Additionally, transmitter (TX) 106 is shown as being coupled to transmitter antenna 107. However, it should be understood that embodiments of the present invention can function with any number of antennas. For example, in an embodiment, main RX 108, diversity RX 110, and/or TX 106 can share one or more antennas. Control signals are sent to main receiver 108, diversity receiver 110, and transmitter 106 from transceiver controller 112. Transceiver controller 112 includes, or is coupled to, at least one SIM. For example, transceiver controller 112 is coupled to SIM1 114 and SIM2 116 in FIG. 1A.

In an embodiment, transceiver controller 112 is a hardware controller. In an embodiment, transceiver controller 112 receives instructions from device controller 104. In an embodiment, device controller 104 is firmware implemented on the same chip as the chip implementing the functionality of transceiver controller 112. In another embodiment, device controller 104 is in communication with transceiver controller 112 but is implemented on a separate chip from the chip implementing the functionality of transceiver controller 112.

Device controller 104 includes an RF device resource manager module 118, which instructs the communications device to issue wake ups for both receiver chains simultaneously. RF device resource manager module 118 sends these instructions to the drivers for receivers 108 and 110 and the transmitter 106. For example, TX chain device driver 120 receives instructions from RF device resource manager module 118 and relays these instructions to transceiver controller 112, which sends control signals for controlling transmitter 106. Transmitter 106 includes baseband processing module 128, digital to analog converter (DAC) 130, selection logic 132, multiplier 134, and transmit logic 136.

RX chain device driver 122 receives instructions from RF device resource manager module 118 and relays these instructions to transceiver controller 112, which sends control signals for controlling the receiver chains of main receiver 108 and diversity receiver 110. Each receiver chain includes selection logic 138, a multiplier 140 for down converting frequency to baseband, an analog to digital converter (ADC) 142, and a baseband processing module 144. In an embodiment, baseband processing module 144 is shared between main receiver 108 and diversity receiver 110.

In FIG. 1A, transceiver controller 112 is coupled to phase lock loops (PLLs) and voltage-controlled oscillators (VCOs). Transmitter PLL/VCO 124 is coupled to transmitter 106. Receiver PLL/VCO 126 is coupled to main receiver 108 and diversity receiver 110.

2.1 Diversity Receiver

In some communications devices supporting a single SIM, functionality of the diversity receiver chain is often unused. For example, this diversity receiver chain can be used during a "connected mode" of a communications device (e.g., during a phone call) to monitor the performance of the phone call. Embodiments of the present invention advantageously leverage the unused diversity receiver chain to support functionality for multiple SIMs. For example, embodiments of the present invention utilize the diversity receiver chain as a separate receiver chain for an additional SIM so that incoming transmissions on both SIMs can be monitored simultaneously during a single wake up without requiring the incorporation of an additional PLL/VCO into transceiver 102.

Because only one service is connected at a time during an active (e.g., connected) mode, the unused service can remain in idle mode while the connected service is in use. For example, if a call is in progress using SIM1 114 (which is connected to main receiver 108), diversity receiver 110 can remain in idle mode because a user of the communications device will not need to be connected to two calls at the same time. While a call is in progress using SIM1 114, RX PLL/VCO 126 is used to support functionality associated with receiving data, and TX PLL/VCO 124 is used to support functionality associated with sending data.

Likewise, if a call is in progress using SIM2 116 (which is connected to diversity receiver 110), main receiver 108 can remain in idle mode. While a call is in progress using SIM2 116, RX PLL/VCO 126 is used to support functionality associated with receiving data, and TX PLL/VCO 124 is used to support functionality associated with sending data.

Embodiments of the present invention allow the communications device to monitor incoming calls for both main receiver 108 and diversity receiver 110 by coupling TX PLL/VCO 124 to the diversity receiver chain. For example, during idle mode (i.e., when the communication device is not sending or receiving data), TX PLL/VCO 124 is not used for transmission because the communications device has no data to transmit. Thus, RX PLL/VCO 126 can be used for monitoring incoming calls for main receiver 108, and TX PLL/VCO 124 can be used for monitoring incoming calls for diversity receiver 110. By configuring TX PLL/VCO 124 to be used by the diversity receiver 110 during idle mode, two independent receiver chains are created without needing to incorporate an additional RX PLL/VCO into transceiver 102.

As previously discussed, implementing these two independent receiver chains alleviates unwanted overhead because both receivers associated with the receiver chains can be issued wake up signals simultaneously. Simultaneously issuing wake up to both receivers avoids the need to transition the communications device from a lower-power idle state to an active (e.g., connected) state that supports the functionality associated with checking for incoming transmissions twice. Thus, embodiments of the present invention advantageously increase battery power efficiency by eliminating the need to implement a time sharing solution to monitor incoming transmissions to the communications device for all supported SIMs.

By eliminating the need for this time sharing solution, the unwanted overhead described above is reduced because the communications device does not need to wake up more often than a communications device supporting only a single SIM. Rather, according to embodiments of the present invention, the communications device checks for incoming transmissions on all SIMs simultaneously.

2.2 Timing

Different services can be associated with different transmission time due to the location of transmitters. For example, in a cellular telephone system, base stations (also known as "cellular sites" or "cells") are associated with each service, and base station timing is not necessarily synchronized. At any given time, the nearest base station for one service may be very close, while the nearest base station for another service may be far away. This distance can impact the timing offset between the services because data has to travel farther to (and/or from) one base station when compared with the distance necessary to travel to (and/or from) the "close" base station.

Further, different base stations can transmit bursts of information to cellular telephones at different times, especially if the base stations are associated with different service providers. When a cellular telephone searches for a base station to connect to, the cellular telephone can briefly initiate a connection to each base station in range. Each base station can then send paging information to the cellular telephone to inform the cellular telephone at which times it sends transmission bursts. For example, a first base station and a second base station may be configured to send transmission bursts every 100 miliseconds, but the second base station may be configured to transmit bursts 50 miliseconds later than the bursts transmitted by the first base station. Embodiments of the present invention take this relative delay into account when selecting base stations.

In an embodiment, RF device resource manager 118 tracks and stores this timing information and uses it to determine a reference wake up time that minimizes the timing offset between these services. For example, RF device resource manager 118 can calculate a transmission time from each base station (e.g., relative to its own internal clock) based on the paging information received from each base station. Based on this calculated transmission time, RF device resource manager 118 can select base stations associated with each service such that the timing difference between the selected base stations is minimized. Thus, in an embodiment, the closest base station associated with any service is not necessarily selected. Rather, RF device resource manager 118 can be configured to instruct the communications device to select base stations for the services in a way that minimizes the relative difference in transmission time from each base station to the communications device.

By minimizing the timing offset between the services, the communications device is enabled to continually transmit wake ups to receivers associated with both services simultaneously. Because base stations are selected such that the transmission time is approximately the same for each service, variation in the transmission time from the base stations among services is eliminated as a factor when determining wake up rates for each service, and incoming transmissions can be checked for each service simultaneously without negatively impacting performance. As previously discussed, enabling a communications device to check for incoming transmissions simultaneously improves battery efficiency and reduces battery power overhead.

2.3 Additional Embodiments

While embodiments of the present invention utilizing two receiver chains (e.g. a main receiver chain and a diversity receiver chain) are described above in FIG. 1A, it should be understood that embodiments of the present invention incorporating three or more receiver chains (e.g., depending on the number of supported SIMs) are envisioned. Further, embodiments of the present invention can be used to implement a hybrid solution incorporating separate receiver chains as well as time sharing. For example, if a communications device supports 4 SIMs and two receiver chains, a communications device may implement time sharing for two SIMs using each receiver chain. Thus, by implementing this time sharing solution, the communications device wakes up half as often (e.g., at a first time to check for incoming transmissions of SIMs 1 and 2 and at a second time to check for incoming transmissions of SIMs 3 and 4), which improves battery power efficiency without requiring four receiver chains in the communications device.

Further, it should be understood that embodiments of the present invention can also be used to provide additional functionality in a communications device having only a single SIM. For example, in a communications device having only a single SIM, diversity receiver 110 can be used to support a different technology (e.g., WiFi or Bluetooth).

Additionally, it should be understood that embodiments of the present invention are applicable to any communications standard. For example, embodiments of the present invention are contemplated to function with a variety of mobile standards, including 3G, 4G, etc.

2.4 Time Sharing for Wake Up During Active Mode

Figure 1B:
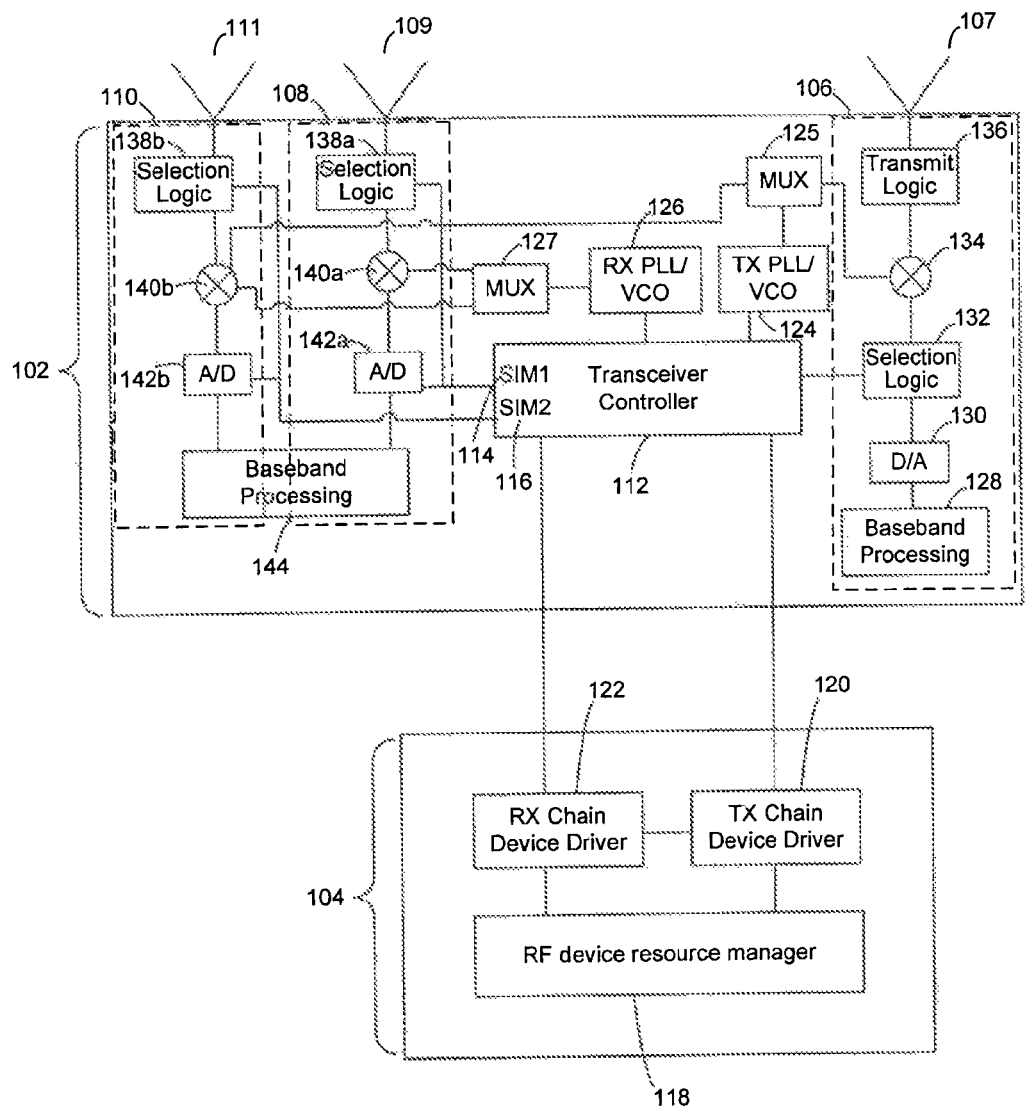
FIG. 1B is a diagram showing an embodiment of the present invention in which multiplexers are incorporated into the hardware of a communications device.

FIG. 1B is a diagram showing another embodiment of the present invention in which multiplexers (MUXes) 125 and 127 are incorporated into transceiver 102. While MUXes 125 and 127 are described as "multiplexers," it should be understood that MUXes 125 and 127 are not necessarily conventional multiplexers but rather can, in some embodiments, be hardware, software, and/or firmware modules that implement functionality of multiplexers and/or demultiplexers.

As previously discussed, SIM1 114 and SIM2 116 are each associated with a different service (e.g., cellular phone service from a cellular phone service provider). SIM1 114 is coupled to main receiver 108 through elements (e.g., multiplier 140a) of the main receiver chain, and SIM2 116 is coupled to diversity receiver 110 through elements (e.g., multiplier 140b) of the diversity receiver chain. At any given time, one service may be active (e.g., if a call is in progress for one phone number associated with one SIM) while the other service is idle. However, while one service is active, incoming transmissions can still be received for the idle service, and, thus, the idle service should periodically be issued a wake up to check for incoming calls even while transmissions are in progress for the active service. Embodiments of the present invention advantageously provide time sharing solutions to enable TX PLL/VCO 124 and RX PLL/VCO 126 to be used to issue brief wake ups to an idle receiver associated with an idle service so that incoming calls are not missed while a call is in progress on an active service. For example, herein, a "wake up" involves coupling the output of PLL/VCO (124 or 126) to the multiplier in the corresponding idle receiver chain, so as to enable reception of any incoming transmissions, while in idle mode.

For example, if a call is in progress for SIM1 114, the main receiver chain is active (e.g., connected). RX PLL/VCO 126 is used for receiving data, and TX PLL/VCO 124 is used to transmit data. In this case, incoming calls can still be monitored for the unused service (associated with SIM2 116 and diversity receiver 110) by connecting the output of TX PLL/VCO 124 to diversity receiver 110 for a very brief period of time (e.g., using time multiplexing via MUX 125) to initiate a wake up. In an embodiment, these wake ups are periodically issued while the call is in progress (e.g., issued every 640 ms or every 1.28 s) to ensure that no incoming transmissions are missed. Because the amount of time needed to initiate a wake up is so brief (e.g., 100-200 ms), incoming calls can be monitored for the unused service with a negligible impact on transmission quality.

Likewise, if a call is in progress for SIM2 116, diversity receiver 110 is active (e.g., connected), and main receiver 108 is idle. RX PLL/VCO 126 is used for receiving data, and TX PLL/VCO 124 is being used to transmit data. In this case, incoming calls are monitored for the unused service (associated with SIM1 114 and main receiver 108) by utilizing a time-sharing solution for one of the PLL/VCOs 124 or 126 to initiate a wake up. For example, in an embodiment, the output of RX PLL/VCO 126 is briefly connected to the main receiver chain associated with main receiver 108 to issue a wake up to main receiver 108. These wake ups are issued to main receiver 108 periodically while a call is in progress using diversity receiver 110 by implementing time division multiplexing using MUX 127.

As described above, when a transmission is in progress for one service (e.g., a phone call is in progress for either SIM1 114 or SIM2 116), TX PLL/VCO 124 is used to transmit data, and RX PLL/VCO 126 is used to receive data for the active service. In FIG. 1B, RX PLL/VCO 126 is shown as coupled, via MUX 127, to main receiver 108 and diversity receiver 110, and TX PLL/VCO 124 is shown as coupled, via MUX 125, to transmitter 106 and diversity receiver 110. Thus, because of the connections shown in. FIG. 1B, time division multiplexing is implemented for waking up diversity receiver 110 using TX PLL/VCO 124, and time division multiplexing is implemented for waking up main receiver 108 using RX PLL/VCO 126.

However, it should be understood that, according to embodiments of the present invention, time division multiplexing for main receiver 108 and diversity receiver 110 can be implemented using either (or both of) RX PLL/VCO 126 or TX PLL/VCO 124. For example, in an embodiment, TX PLL/VCO 124 is also coupled to main receiver 108 via MUX 125. Thus, when a call is in progress using diversity receiver 110, wake ups can be periodically issued from TX PLL/VCO 124, via MUX 125, to main receiver 108. In a similar fashion, wake ups can be time division multiplexed to diversity receiver 110 while main receiver 108 is active using RX PLL/VCO 126 and MUX 127.

In an embodiment, multiplexers 125 and 127 receive a status signal (e.g., from transceiver controller 112) that indicates a current state of the communications device (e.g., active, idle, wakeup needed, etc.). In an embodiment, this status signal is generated by RF device resource manager 118 and sent to multiplexer 125 from transceiver controller 112. Based on the value of this status signal, multiplexers 125 and 127 transmit to an appropriate destination. For example, in an embodiment according to FIG. 1B, MUX 125 transmits data to transmitter 106 unless it receives a status signal indicating that a wake up should be issued to diversity receiver 110. Likewise, MUX 127 receives data from the active service (either from main receiver 108 or diversity receiver 110). When MUX 127 receives a status signal indicating that the idle service needs to be issued a wake up, MUX 127 transmits a brief wake up to the idle service and then resumes receiving data from the active service.

3. METHODS

A method of calculating a wake up signal transmission time will now be described with reference to FIG. 2 and FIG. 1A. In step 200, a first plurality of transmitters (e.g., base stations) transmitting a first service from a first service provider is detected (e.g., by transceiver controller 112 and/or RF device resource manager 118). For example, in an embodiment, these transmitters are base stations associated with the service provider servicing SIM1 114.

In step 202, a second plurality of transmitters transmitting a second service from a second service provider is detected.

For example, in an embodiment, these transmitters are base stations associated with the service provider servicing SIM2 116.

In step 204, transceiver controller 112 and/or RF device manager 118 selects base stations from each of these groups of transmitters such that the relative difference in transmission time from each base station to the communications device is minimized. In other words, these base stations are selected such that a difference between the transmission time from the first transmitter to the communications device and a transmission time from the second transmitter to the communications device is minimized.

In step 206, transceiver controller 112 and/or RF device manager 118 calculates a wake-up signal transmission time based on the transmission times of the selected transmitters. Because transmitters are selected such that the transmission times from the communications device to each transmitter is approximately the same for each service, incoming transmissions can be checked for each service simultaneously without negatively impacting performance. As previously discussed, enabling a communications device to check for incoming transmissions simultaneously improves battery efficiency and reduces battery power overhead.

Figure 3:
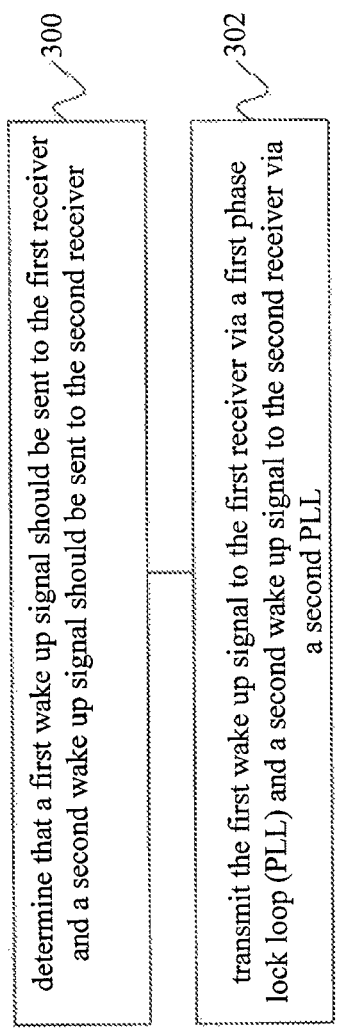
FIG. 3 is a flowchart illustrating a method for sending wake up signals in a communications device having first and second receivers in accordance with an embodiment of the present invention.

A method for sending wake up signals in a communications device having first and second receivers will now be described with reference to FIG. 3 and FIG. 1A. In step 300, transceiver controller 112 and/or RF device resource manager 118 determines that wake up signals should be sent to each receiver (e.g., main receiver 108 and diversity receiver 110). For example, if the communications device is idle, wake up signals are sent to main receiver 108 and diversity receiver 110 simultaneously at a certain interval. In an embodiment, this interval is determined using the method described in FIG. 2.

In step 302, a first wake up signal is transmitted to the first receiver (e.g., main receiver 108) via a first PLL (e.g., RX PLL/VCO 126), and a second wake up signal is transmitted to the second receiver (e.g., diversity receiver 110) via a second PLL (e.g., TX PLL/VCO 124). By utilizing both phase PLL's 124 and 126, wake up signals can be sent to both receivers 108 and 110 simultaneously, leading to an increase in battery efficiency and a reduction in overhead.

Figure 4:
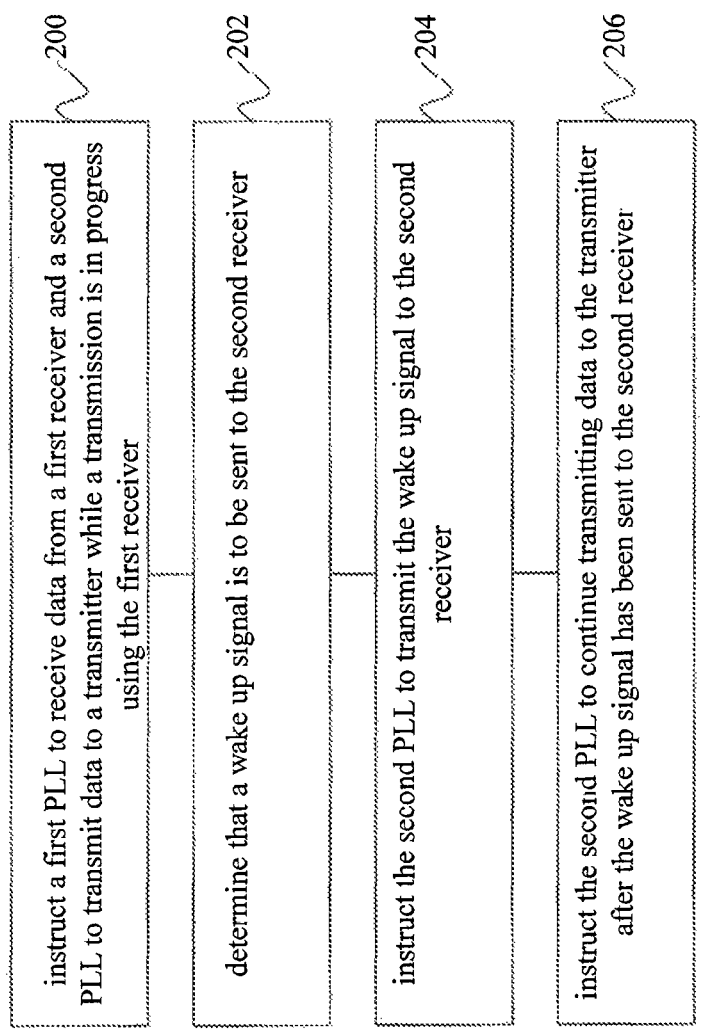
FIG. 4 is a flowchart illustrating a method for sending a wake up signal to an idle receiver while an active receiver is conducting a transmission in accordance with an embodiment of the present invention.

A method for sending a wake up signal to an idle receiver while an active receiver is conducting a transmission will now be described with reference to FIG. 4 and FIG. 1B. In step 200, a first PLL (e.g., RX PLL/VCO 126) is instructed to receive data from a first receiver (e.g., main receiver 108), and a second PLL (e.g., TX PLL/VCO 124) is instructed to transmit data to a transmitter (e.g., transmitter 106) while a transmission is in progress using the first receiver (e.g., while a call is in progress for SIM1 114, which is connected to main receiver 108).

In step 402, transceiver controller 112 and/or RF device manager 118 determines that a wake up signal is to be sent to the second receiver (e.g., diversity receiver 110). For example, a wake up signal is sent if transceiver controller 112 and/or RF device manager 118 determines that the wake up signal transmission time for diversity receiver 110 has been reached. This wake up signal transmission time may be determined, for example, by the process described in FIG. 2.

In step 404, transceiver controller 112 and/or RF device manager 118 instructs the second PLL (e.g., TX PLL/VCO 124) to transmit the wake up signal to the second receiver (e.g., diversity receiver 110). In an embodiment, this wake up signal is sent to the second receiver using time division multiplexing, which can be performed, for example, by MUX 125.

In step 406, transceiver controller 112 and/or RF device manager 118 instructs the second PLL (e.g., TX PLL/VCO 124) to continue transmitting data to the transmitter after the wake up signal has been sent. Thus, by leveraging existing circuitry (e.g., TX PLL/VCO 124) to transmit brief, periodic wake up signals, embodiments of the present invention advantageously minimize the amount of circuitry needed in a communications device while continuing to support wake up functionality for both receivers 108 and 110 even while a one receiver is active (e.g., in connected mode).

4. CONCLUSION

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A communications device comprising:
   a first receiver coupled to a first phase lock loop (PLL) and a first subscriber identity module (SIM);
   a second receiver coupled to the first PLL, a second PLL, and a second SIM;
   a transmitter coupled to the second PLL; and
   a controller coupled to the first PLL and the second PLL, wherein the controller is configured to:
      initiate, using the first PLL, a first wake up signal for the first receiver if a first transmission is in progress using the second SIM, and
      initiate, using the second PLL, a second wake up signal for the second receiver if a second transmission is in progress using the first SIM.

2. The communications device of claim 1, wherein the first wake up signal and the second wake up signal are transmitted simultaneously.

3. The communications device of claim 1, wherein the communications device is in an idle state when the first wake up signal and the second wake up signal are transmitted.

4. The communications device of claim 1, wherein the first SIM is associated with a first cellular phone service, and wherein the second SIM is associated with a second cellular phone service.

5. The communications device of claim 1, wherein the first receiver is a main receiver of a cellular telephone, and wherein the second receiver is a diversity receiver of a cellular telephone.

6. The communications device of claim 1, wherein the controller is configured to select a first transmitter for transmitting a first service to the first receiver and a second transmitter for transmitting a second service to the second receiver such that a difference in transmission time from the communications device to the first transmitter and from the communications device to the second transmitter is minimized.

7. A communications device comprising:
   a first receiver coupled to a first phase lock loop (PLL) and a first subscriber identity module (SIM);
   a second receiver coupled to the first PLL, a second PLL, and a second SIM;
   a transmitter coupled to the second PLL; and
   a controller coupled to the first PLL and the second PLL, wherein the controller is configured to:
      couple an output of the first PLL to the first receiver to initiate a first wake-up signal for the first receiver while a call is in progress using the second SIM, and
      couple an output of the second PLL to the second receiver to initiate a second wake-up signal for the second receiver while a call is in progress using the first SIM.

8. The communications device of claim 7, further comprising:
   a multiplexer (MUX) coupled to the second PLL, the transmitter, and the second receiver.

9. The communications device of claim 8, wherein the MUX is configured to use time division multiplexing to transmit the second wake up signal.

10. The communications device of claim 7, wherein the communications device is a cellular telephone, wherein the first SIM is associated with a first cellular phone service, and wherein the second SIM is associated with a second cellular phone service.

11. A method for sending wake up signals in a communications device having first and second receivers, the method comprising:
   determining that a first wake up signal should be sent to the first receiver and a second wake up signal should be sent to the second receiver;
   initiating the first wake up signal for the first receiver via a first phase lock loop (PLL) if a first transmission, is in progress using a second subscriber identity module (SIM) associated with the second receiver; and
   initiating a second wake up signal for the second receiver via a second PLL if a second transmission is in progress using a first SIM associated with the first receiver.

12. The method of claim 11, wherein the first wake up signal and the second wake up signal are simultaneously transmitted while the communications device is in idle mode.

13. The method of claim 11, further comprising:
   detecting a first plurality of transmitters transmitting a first service;
   detecting a second plurality of transmitters transmitting a second service; and
   selecting a first transmitter in the first plurality of transmitters and a second transmitter in the second plurality of transmitters such that a difference between a first transmission time from the communications device to the first transmitter and a second transmission time from the communications device to the second transmitter is minimized.

14. The method of claim 13, further comprising:
   calculating a wake up signal transmission time based on the first transmission time and the second transmission time; and
   simultaneously transmitting the first wake up signal and the second wake up signal at the wake up signal transmission time.

15. The communications device of claim 1, wherein the first receiver is coupled to a first antenna, and wherein the second receiver is coupled to a second antenna.

16. The communications device of claim 1, wherein the controller is further configured to couple an output of the first PLL to the first receiver to initiate the first wake-up signal.

17. The communications device of claim 1, wherein the controller is further configured to couple an output of the second PLL to the second receiver to initiate the second wake-up signal.

18. The communications device of claim 7, wherein the first receiver is coupled to a first antenna, and wherein the second receiver is coupled to a second antenna.

* * * * *